United States Patent [19]
Enz

[11] Patent Number: 5,460,389
[45] Date of Patent: Oct. 24, 1995

[54] JAW ASSEMBLY

[76] Inventor: Eric W. Enz, 3243 Waverly St., Palo Alto, Calif. 94306

[21] Appl. No.: 219,660

[22] Filed: Mar. 29, 1994

[51] Int. Cl.$^6$ .................................................. B23B 31/12
[52] U.S. Cl. ........................................ 279/123; 279/153
[58] Field of Search ................................ 279/123, 124, 279/153

[56] References Cited

U.S. PATENT DOCUMENTS

| | | | |
|---|---|---|---|
| 353,736 | 12/1886 | Curry | 279/123 |
| 2,896,958 | 7/1959 | Strauss | 279/123 |
| 2,950,117 | 8/1960 | Walmsley | 279/123 |
| 3,179,430 | 4/1985 | Zierdan | 279/123 |
| 4,706,973 | 11/1987 | Covarrubias et al. | 279/153 |
| 4,861,048 | 8/1989 | Slater | 279/123 |

FOREIGN PATENT DOCUMENTS

| | | | |
|---|---|---|---|
| 2143163 | 2/1985 | United Kingdom | 279/153 |

OTHER PUBLICATIONS

Tools & Gages Inc.; Industrial Product Buyers Guide; 1992.
Abbott Aluminium Chuck Jaws Catalog 16, Jul. 1991.

*Primary Examiner*—Steven C. Bishop
*Attorney, Agent, or Firm*—Flehr, Hohbach, Test, Albritton & Herbert

[57] ABSTRACT

A jaw assembly for use with a lathe chuck which is rotatable about an axis and provided with at least two first cooperative mating portions circumferentially spaced apart about the axis. The jaw assembly includes at least two cylindrical bodies. Each body has a longitudinal axis, a cylindrical outer surface and first and second spaced-apart generally parallel outer planar surfaces disposed in planes generally perpendicular to the longitudinal axis and to the cylindrical outer surface. Each body is adapted to have at least three circumferentially spaced-apart workpiece-receiving cutouts therein extending through at least the outer cylindrical surface and the first planar surface. Each body carries second cooperative mating portions for mating with the first cooperative mating portions of the chuck to secure the body to the chuck so that the body rotates in an immovable manner with respect to the chuck. The bodies are mountable with respect to the chuck to rotate therewith in at least three different positions.

10 Claims, 2 Drawing Sheets

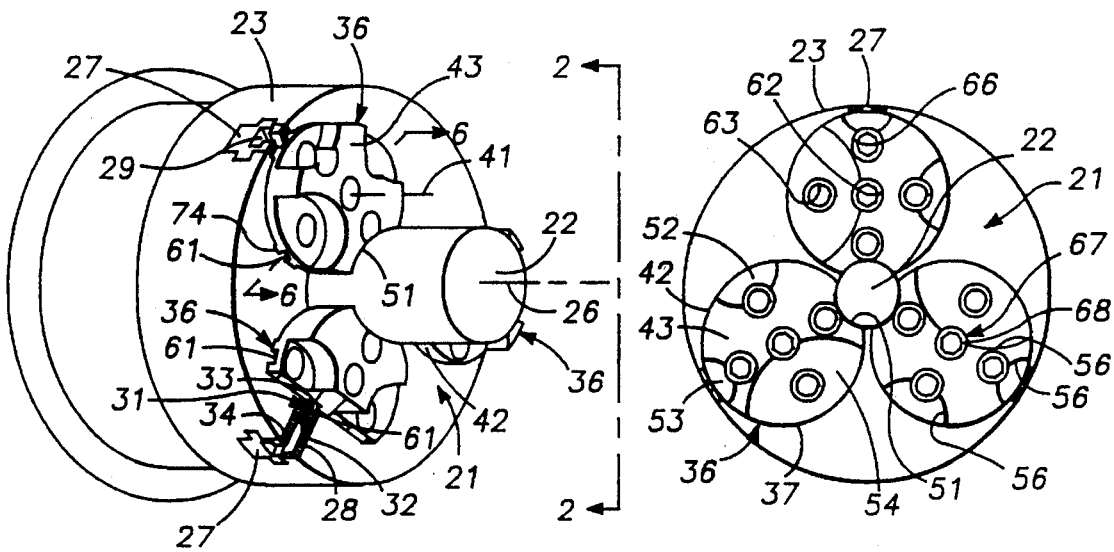
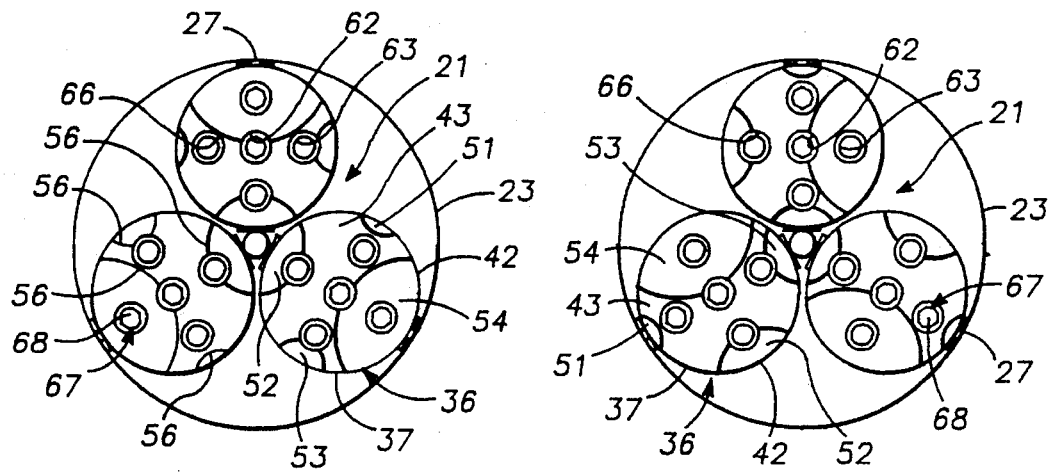
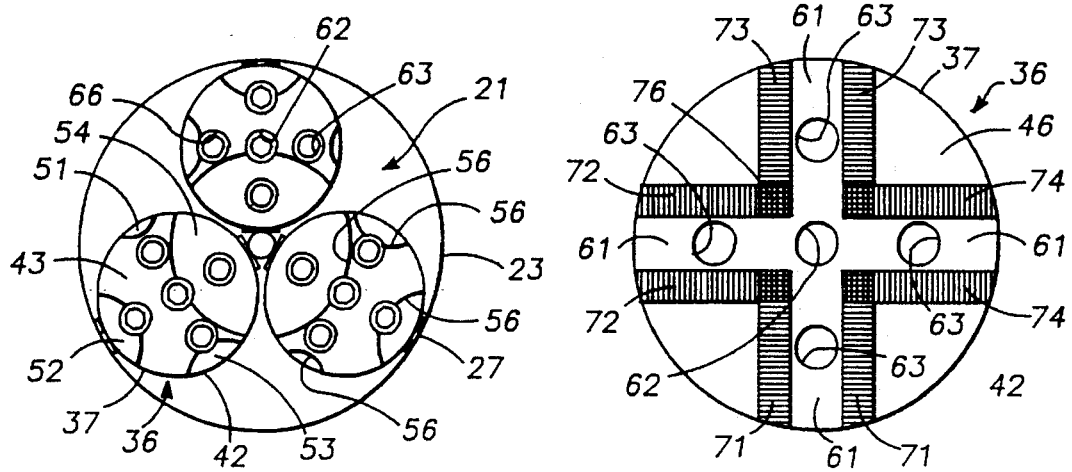
FIG.-1　　FIG.-2　　FIG.-3　　FIG.-4　　FIG.-5　　FIG.-6

JAW ASSEMBLY

This invention pertains generally to jaw assemblies for use on lathe chucks and, more particularly, to jaw assemblies having jaws in which multiple workpiece-receiving cutouts can be formed.

Soft jaws have been provided for use with manual and computer numerically controlled lathes to grip a workpiece during machining. Some soft jaws are reversible. Soft jaws heretofore provided, however, suffer from the disadvantage of having only two working portions in which cutouts can be formed for gripping the workpiece. Because of the foregoing, there is a need for a new and improved jaw assembly which overcomes the above named disadvantages.

In general, it is an object of the present invention to provide a jaw assembly having jaws in which at least three workpiece-receiving cutouts in circumferential spaced-apart position can be formed in each jaw.

Another object of the invention is to provide a jaw assembly of the above character in which each jaw is mountable to a chuck in at least three different positions.

Another object of the invention is to provide a jaw assembly of the above character in which the jaws are repeatably registerable with the chuck in each position to facilitate remachining of a workpiece.

Additional objects and features of the invention will appear from the following description from which the preferred embodiments are set forth in detail in conjunction with the accompanying drawings.

FIG. 1 is an isometric view, partially cut away, of a jaw assembly of the present invention in use on a chuck of a computer numerically controlled lathe.

FIG. 2 is a front elevational view of the jaw assembly shown in FIG. 1 taken along the line 2—2 of FIG. 1.

FIG. 3 is front elevational view similar to FIG. 2 showing the jaw assembly shown in FIG. 1 in a second position.

FIG. 4 is front elevational view similar to FIG. 2 showing the jaw assembly shown in FIG. 1 in a third position.

FIG. 5 is front elevational view similar to FIG. 2 showing the jaw assembly shown in FIG. 1 in a fourth position.

FIG. 6 is a rear elevational view of one of the jaws of the jaw assembly shown in FIG. 1 taken along the line 6—6 of FIG. 1.

Figure 7:
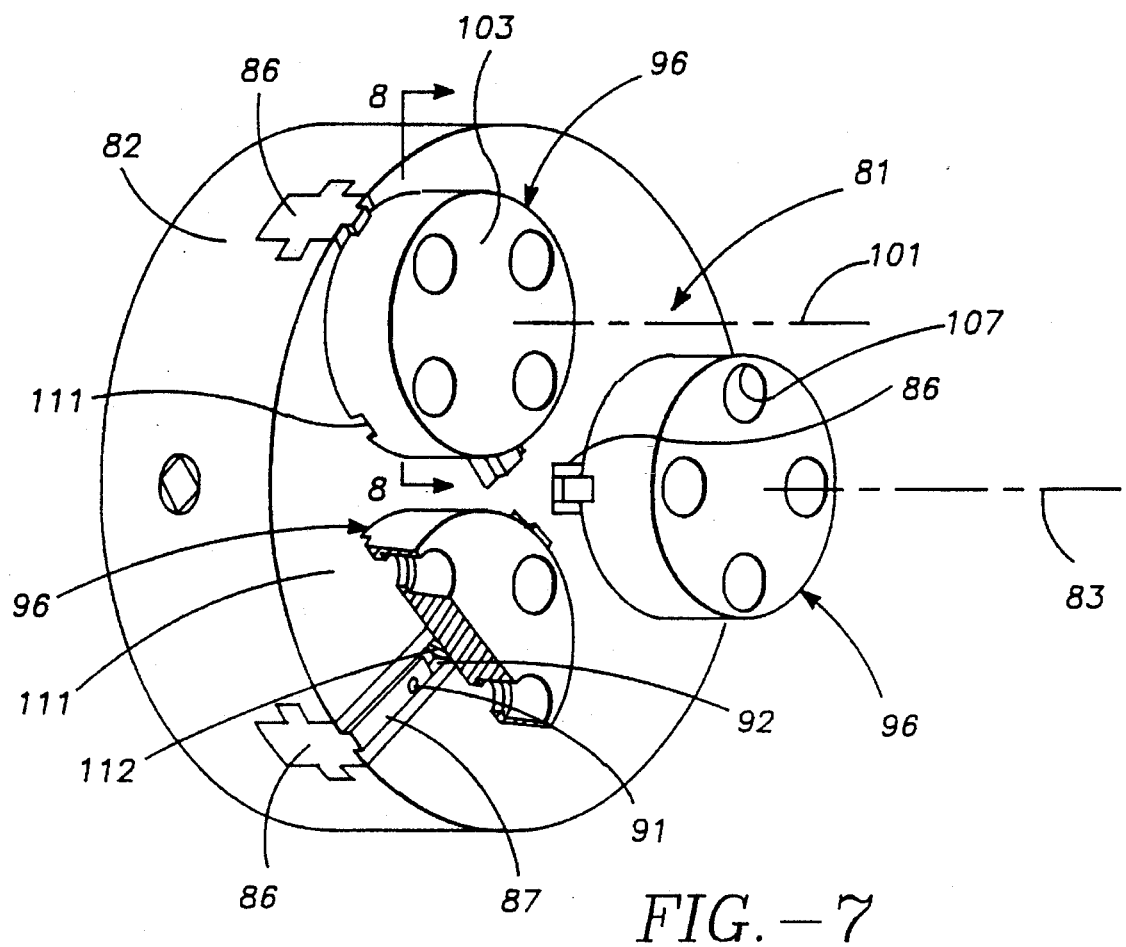
FIG. 7 is another embodiment of the jaw assembly of the present invention in use on a chuck of a manually controlled lathe.

In general, the jaw assembly of the present invention is for use with a lathe chuck which is rotatable about an axis and provided with at least two first cooperative mating means circumferentially spaced-apart about the axis. The jaw assembly includes at least two cylindrical bodies. Each body has a longitudinal axis, a cylindrical outer surface and first and second spaced-apart generally parallel outer planar surfaces disposed in planes generally perpendicular to the longitudinal axis and to the cylindrical outer surface. Each body is adapted to have at least three circumferentially spaced-apart workpiece-receiving cutouts therein extending through at least the outer cylindrical surface and the first planar surface. Each body carries second cooperative mating means for mating with the first cooperative mating means of the chuck to secure the body to the chuck so that the body rotates in an immovable manner with respect to the chuck. The bodies are mountable with respect to the chuck to rotate therewith in at least three different positions.

More in particular, jaw assembly 21 of the present invention is for rotatably securing a workpiece 22 to a lathe to permit shaping or other machining of the workpiece. The lathe, which can be a computer numerically controlled lathe as partially shown in FIG. 1, includes a chuck 23 which is rotatable about a central axis 26 and is provided with a plurality of at least two first cooperative mating means or portions. Chuck 23 as illustrated in FIG. 1 includes at least three cooperative mating portions and, in this regard, has three elongate adjustment members or slide bars 27 which extend radially from central axis 26 and are circumferentially spaced-apart about axis 26 at approximately equal angular distances of 120°. Each slide bar 27 is movable inwardly and outwardly with respect to the central axis and includes an outer surface 28 and a central channel 29 which is generally the shape of an inverted T when viewed in cross-section and which opens longitudinally along the center of outer surface 28. An inverted T-member or slide member 31 is slidably disposed in channel 29 and has a raised guide or rail 32 extending up from the channel longitudinally along the center of outer surface 28. The portion of rail 32 exposed above surface 28 is generally rectangular in cross-section. Two longitudinally spaced-apart threaded bores 33 extend perpendicularly into each rail 32. A plurality of V-shaped serrations 34 are formed on outer surface 28 along each side of channel 29 and extend generally perpendicularly from channel 29 in a transverse direction along outer surface 28.

Jaw assembly 21 includes at least two cylindrical soft jaws and as shown in FIG. 1 three cylindrical soft jaws 36 mountable to chuck 23. Each jaw 36 is formed from a cylindrical body 37 made of any suitable material such as aluminum and having a central longitudinal axis 41. Each cylindrical body 37 is generally circular in cross section and includes a cylindrical or circular outer surface 42. First and second spaced-apart generally parallel planar surfaces 43 and 46 are disposed in planes generally perpendicular to longitudinal axis 41 and to outer surface 42. Jaws 36 have a transverse dimension or diameter ranging from approximately 40% to 50% and preferably approximately 45% of the transverse dimension or diameter of chuck 23 and a thickness measured by the distance between surfaces 43 and 46 ranging from approximately 1.5 to 6.0 inches and preferably approximately 2 inches.

Each jaw 36 is adaptable to have at least three circumferentially spaced-apart working portions with workpiece-receiving cutouts formed therein. In the embodiment of jaw assembly 21 illustrated in the drawings, each jaw 36 is provided with a plurality of at least four cutouts which are identified therein as first, second, third and fourth cutouts 51, 52, 53 and 54 and are spaced circumferentially about the jaw at angular distances of approximately 90°. The cutouts extend through at least first surface 43 and outer surface 42 and are formed in part by an arcuate gripping surface 56 which extends perpendicularly through surface 43 and has a contour and as shown a radius generally equal to that of workpiece 22. It should be appreciated that the cutouts can also extend through second surface 46 and be within the scope of the present invention.

Second cooperative mating means is carried by each cylindrical body 37 for mating with a slide bar 27 of chuck 23 and securing the body to the chuck so as to rotate the body in an immovable manner with respect to the chuck. The cooperative mating means of each body 37 includes four grooves 61 formed in second surface 46. Each groove 61 extends along the second surface in a radial direction from longitudinal axis 41 and has a cross-section configured and sized for snug disposition about a rail 32. The grooves intersect at longitudinal axis 41 at approximately right angles and are circumferentially disposed along surface 46 so that one of the grooves angularly corresponds about axis 41 with the centerline of one of cutouts 51, 52, 53 or 54 extending through surfaces 42 and 43 of the body.

Each cylindrical body 37 is provided with a central bore 62 extending along longitudinal axis 41 between first and second surfaces 43 and 46 and four circumferentially disposed bores 63 extending between surfaces 43 and 46 in a direction generally parallel to longitudinal axis 41. Bores 63 are circumferentially spaced-apart about axis 41 at equal angular distances of approximately 90°. In this manner, central bore 62 is disposed between one pair of bores 63 in linear alignment along one diameter of body 37 and between the other pair of bores 63 in linear alignment along a second diameter of the body which is generally perpendicular to said first diameter. Bores 63 are disposed in cylindrical body 37 so that one bore 63 opens into each groove 61 in second surface 46. The distance between central bore 62 and each bore 63 generally corresponds to the distance between spaced-apart threaded bores 33 of slide bars 27. Each of bores 62 and 63 is formed with an enlarged counterbore 66 which opens into first surface 43.

A pair of bolts 67 are utilized for mounting each jaw 36 to chuck 23. One bolt 67 extends through central bore 62 and the second bolt 67 extends through one of bores 63. Bolts 67 have heads 68 which seat within counter bores 66 and threaded ends (not shown) which threadedly engage threaded bores 33 of slide bars 27.

Each cylindrical body 37 has registration means which includes first, second, third and fourth sets of grooves or serrations 71, 72, 73 and 74 for permitting repeatable relative alignment between cylindrical jaws 36 and chuck 23. These serrations are formed in second surface 46 so as to be elevated thereabove and are configured and sized so as to cooperatively mate with serrations 63 of slide bars 27. In this regard, serrations 71, 72, 73 and 74 are generally V-shaped in cross-section. One set is provided for each groove 61 and each set has portions which extend along opposite sides of a groove in directions transverse to an imaginary line extending from longitudinal axis 41 along the groove. More specifically, each set of serrations extend at generally right angles to the corresponding groove 61. Adjacent sets of serrations 71, 72, 73 and 74 intersect at approximately right angles at the radially inward portions thereof to form a grid-like pattern of pyramid-shaped elements 76.

In operation and use, cylindrical jaws 36 are mountable to chuck 23 in at least three different positions and as shown in FIGS. 2 through 5 in at least four different positions for permitting, for example, repeatable work on four different workpieces 22. In this process, three blank cylindrical jaws 36 having no cutouts formed therein are mounted to the three slide bars 27 and the three slide members 31 carried by the slide bars. Cylindrical bodies 37 are longitudinally positioned on the slide members so that central bores 62 and one of bores 63 align with the two threaded bores 33 of the slide members. In many instances, the radially outermost bores 63 will be utilized with central bores 62 for mounting bodies 37 to chuck 23.

After bolts 67 are inserted through bores 62 and 63 and are generally engaged with bores 33 of slide members 31, the cylindrical bodies and the slide members are moved radially relative to slide bars 27 so jaws 36 are in the generally desired position on chuck 23. Serrations 34 and corresponding serrations 71, 72, 73 or 74 are longitudinally aligned along rail 32 and groove 61, respectively, so as to permit exact alignment between jaws 36 and chuck 23. Once bolts 67 are tightened and cylindrical jaws 36 have been secured to slide bars 27, the cooperative mating of rails 32 and grooves 61 and of serrations 34 and corresponding serrations 71, 72, 73 or 74 facilitate the cylindrical jaw rotating in an immovable manner on chuck 23.

Once jaws 36 have been mounted to chuck 23, a first cutout 51 corresponding to the workpiece 22 desired to be machined is formed in jaws 36. Slide bars 27 are moved radially outwardly from central axis of rotation 26 so as to further separate jaws 36 and workpiece 22 is placed inside cutouts 51. Slide bars 27 and jaws 36 are moved radially inwardly so that gripping surfaces 56 of the jaws snugly secure the workpiece to chuck 23 and permit rotation of the workpiece about central axis 26 of the chuck.

Jaws 36 can be alternately mounted or positioned on chuck 23 so that second, third, and fourth cutouts 52, 53 and 54 can be formed therein as illustrated in FIGS. 3, 4 and 5. In reconfiguring the cylindrical jaws on the chuck, the bolts 67 extending through central bores 62 of the jaws are loosened slightly and the other bolts 67 extending through the radially outermost bores 63 are removed to permit rotation of the jaws about the bolts extending through central bores 62. A second groove 61 for each jaw is aligned about rail 32 of the corresponding slide bar 27 and the jaws resecured to the chuck with bolts 67 in a manner similar to that discussed above.

Cylindrical jaws 36 securely grip workpiece 22 during machining. When the cylindrical jaws are in their operative position as shown in the drawings, they are in relatively close proximity to each other. Corresponding aligned cutouts 51, 52, 53 and 54 and gripping surfaces 56 thereof extend around almost the full circumference of the workpiece so as to provide a continuous and firm grip thereabout during machining.

If the lathe operator desires to reutilize one of the sets of cutouts 51, 52, 53 or 54 formed in cylindrical jaws 36, the operator can easily reconfigure cylindrical jaws 36 on chuck 23 so that the desired cutouts are in a cooperative and operative position on the chuck. The cooperative mating of serrations 71, 72, 73 or 74 provided on second surface 46 of the cylindrical jaws with serrations 34 on slide bars 27 permit repeatable relative alignment between the cylindrical jaws and the chuck in this regard.

Figure 8:
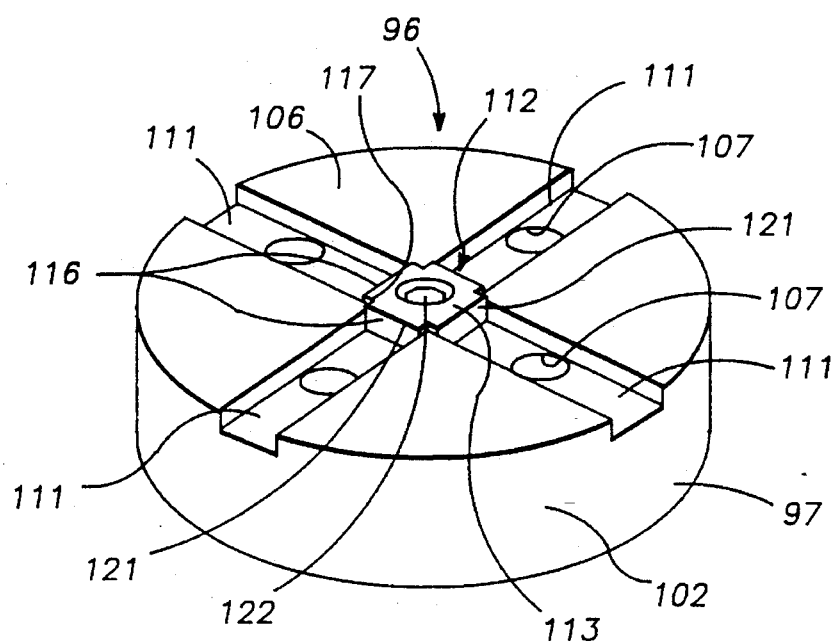
FIG. 8 is an isometric view of one of the jaws of the jaw assembly shown in FIG. 7 taken along the line 8—8 of FIG. 7.

In another embodiment of the present invention, a jaw assembly 81 is provided which is particularly suitable for manual lathes (see FIGS. 7 and 8). Jaw assembly 81 is for use with a chuck 82 rotatable about a central axis 83 and provided with a plurality of elongate slide bars 86 movable radially inwardly and outwardly with respect to central axis 83. Slide bars 86 each have a rail 87 extending longitudinally along the center thereof and are provided with spaced-apart threaded bores 91 extending into the rail. An indexing or registration recess 92 is formed in rail 87 between bores 91.

Jaw assembly 81 includes three cylindrical jaws 96 which are substantially similar to cylindrical jaws 36. Each jaw 96 is formed from a cylindrical body 97 having a central longitudinal axis 101 and a cylindrical or circular outer surface 102 extending about longitudinal axis 101. First and second spaced-apart generally parallel planar surfaces 103 and 106 extend in planes generally perpendicular to longitudinal axis 101 and outer surface 102. Although not shown in the drawings, at least four cutouts similar to the cutouts formable in cylindrical jaws 36 can be made in each cylindrical jaw 96.

Means for mounting cylindrical jaws 96 to chuck 82 is provided and includes four bores 107 extending circumferentially about longitudinal axis 101 at generally equal angular distances of approximately 90°. As so disposed, each pair of bores 97 disposed on opposite sides of longitudinal axis 101 are generally colinear with an imaginary line extending through longitudinal axis 101 and are spaced-apart a distance so as to correspond to the spacial distance between threaded bores 91 of slide bars 86. Four grooves 111 are formed in second surface 106 of each cylindrical body 97. Grooves 111 extend radially outwardly from longitudinal axis 101 and are circumferentially spaced-apart so that a pair grooves 101 on either side of longitudinal axis 101 are in general linear alignment and at right angles to the other pair of grooves 111 which also extend from opposite sides of longitudinal axis 101 in general linear alignment. One of bores 107 extends into each groove 111.

Cylindrical jaws 96 include means for registering the jaws with slide bars 86 of chuck 82. In this regard, a key member or a key 112 is removably mounted to the inside of grooves 111 where the grooves intersect on second surface 106 at longitudinal axis 101. Each key 112 is generally in the form of a parallelepiped having opposite first and second generally parallel and planar surfaces 113 and sides 116 extending between surfaces 113. Cutouts 117 extend between each corner of surfaces 113. Each key 117 is sized so as to be snugly disposed within grooves 111 at their intersection and cutouts 117 form portions 121 which extend partially down each groove 111 in a direction away from longitudinal axis 101. The key is secured to second surface 106 by any suitable means such as a recessed bolt 122 extending through a bore (not shown) between first and second surfaces 103 and 106 and into a threaded bore (not shown) provided in second surface 106 along longitudinal axis 101. The distance between surfaces 113 and the distance between sides 116 are sized so as to prevent relative snug disposition of key 112 into registration recess 92 of slide bars 86 and, in this regard, the outer surface of key 122 is elevated or spaced above second surface 106 of body 97.

In operation and use, cylindrical jaws 96 are mountable to chuck 82 in an immovable manner in at least four different positions. Key extension portions 121 facilitate nonrotative engagement between keys 117 and cylindrical bodies 97 and hence between jaws 96 and chuck 82. The cooperative mating between keys 112 and registration recesses 92 ensures repeatable relative alignment between jaws 96 and chuck 82 in each of these positions.

From the foregoing, it can be seen that a new and improved jaw assembly has been provided in which at least three workpiece-receiving cutouts in circumferential spaced-apart position can be formed in each jaw of the assembly. The jaws are mountable to a chuck in at least three different positions and are repeatedly registerable with the chuck in each position to facilitate remachining of a workpiece.

What is claimed is:

1. A soft jaw assembly for use with a lathe chuck to permit work on a workpiece, the chuck being rotatable about a center and being provided with at least three elongate adjustment elements circumferentially spaced apart about the chuck for radial movement relative to the center of the chuck, each elongate adjustment element having a planar outer surface provided with first cooperative mating means which includes a plurality of first protuberances longitudinally spaced apart along the elongate adjustment element and being provided with at least two threaded bores extending through the outer surface for threadedly receiving respective bolt elements, comprising at least three cylindrical bodies, each body having a longitudinal axis, a cylindrical outer surface and spaced-apart generally parallel first and second outer planar surfaces disposed in planes generally perpendicular to the longitudinal axis and to the cylindrical outer surface, each body being adapted to have at least three circumferentially spaced-apart workpiece-receiving cutouts therein extending through at least the outer cylindrical surface and the first planar surface and being adapted to mount directly on an elongate adjustment element in at least three different angular positions to rotate with the chuck, the second planar surface of each body being provided with second cooperative mating means for mating with the first cooperative mating means of the elongate adjustment element so that the body rotates in an immovable manner with respect to the chuck when mounted thereto in each of its three different angular positions, the second cooperative mating means of each body including a plurality of second protuberances spaced apart along the second planar surface for cooperatively engaging the first protuberances of the first cooperative mating means and permitting the body to be mounted on the respective elongate adjustment element in a plurality of positions relative to the center of the chuck, the bodies being provided with bores extending between the first and second planar surfaces adapted for receiving the bolt elements whereby the bodies are secured to the elongate adjustment elements by the bolt elements and the mounting of the bodies directly to the elongate adjustment elements and the securing of the bodies to the elongate adjustment elements with the bolt elements permits the bodies to provide significant holding forces on the workpiece during operation of the chuck.

2. The jaw assembly of claim 1 in combination with the chuck of claim 1.

3. The jaw assembly of claim 1 wherein the cylindrical bodies are each adapted to have at least four circumferentially spaced-apart workpiece-receiving cutouts therein extending through at least the outer cylindrical surface and the first planar surface and are each adapted to mount directly on an elongate adjustment element in at least four different angular positions to rotate with the chuck.

4. The jaw assembly of claim 1 wherein the second protuberances of each cylindrical body are included within registration means carried by the body for permitting repeatable relative alignment between the body and the chuck.

5. The jaw assembly of claim 4 wherein the second protuberances are in the form of serrations formed on the second planar surface.

6. The jaw assembly of claim 5 wherein the serrations of each second cooperative mating means are disposed on the second planar surface transversely to an imaginary line extending through the longitudinal axis of the body.

7. The jaw assembly of claim 1 wherein the second cooperative mating means of each body includes a groove in the second planar surface with respect to each workpiece-receiving cutout, each groove extending through the longitudinal axis of the body.

8. The jaw assembly of claim 1 wherein the cylindrical outer surface is circular in cross-section.

9. A soft jaw for use with a lathe chuck to permit work on a workpiece, the chuck being rotatable about a center and being provided with a plurality of elongate adjustment elements circumferentially spaced-apart about the chuck for radial movement relative to the center of the chuck, each elongate adjustment element having a planar outer surface provided with first cooperative mating means which includes a plurality of first protuberances longitudinally spaced-apart along the elongate adjustment element and being provided with at least two threaded bores extending through the outer surface for threadedly receiving respective bolt elements, comprising a cylindrical body having a longitudinal axis, a cylindrical outer surface and spaced-apart generally parallel first and second outer planar surfaces disposed in planes generally perpendicular to the longitudinal axis and to the cylindrical outer surface, the body being adapted to have at least three circumferentially spaced-apart workpiece-receiving cutouts therein extending through at least the outer cylindrical surface and the first planar surface and being adapted to mount directly on an elongate adjustment element to rotate with the chuck in at least three different angular positions, the second planar surface being provided with second cooperative mating means for mating with the first cooperative mating means of the elongate adjustment element so that the body rotates in an immovable manner with respect to the chuck when mounted thereto in each of its three different angular positions, the second cooperative mating means of the body including a plurality of second protuberances spaced-apart along the second planar surface for cooperatively engaging the first protuberances of the first cooperative mating means and permitting the body to be mounted on the respective elongate adjustment element in a plurality of positions relative to the center of the chuck, the body being provided with bores extending between the first and second planar surfaces for receiving the bolt elements whereby the body is secured to the elongate adjustment element by the bolt elements and the mounting of the body directly to the elongate adjustment element and the securing of the body to the elongate adjustment element with the bolt elements permits the body to provide significant holding forces on the workpiece during operation of the chuck.

10. The soft jaw of claim 9 wherein the cylindrical body is adapted to have at least four circumferentially spaced-apart workpiece-receiving cutouts therein extending through at least the outer cylindrical surface and the first planar surface and is adapted to mount directly on the respective elongate adjustment element to rotate with the chuck in at least four different angular positions.

* * * * *

UNITED STATES PATENT AND TRADEMARK OFFICE
CERTIFICATE OF CORRECTION

PATENT NO. : 5,460,389
DATED : October 24, 1995
INVENTOR(S) : ERIC W. LENZ

It is certified that error appears in the above-indentified patent and that said Letters Patent is hereby corrected as shown below:

On the title page: Item [76] Inventors: should read

Eric W. Lenz.

Signed and Sealed this

Twenty-eighth Day of May, 1996

Attest:

BRUCE LEHMAN

*Attesting Officer*      *Commissioner of Patents and Trademarks*